Figure 1:
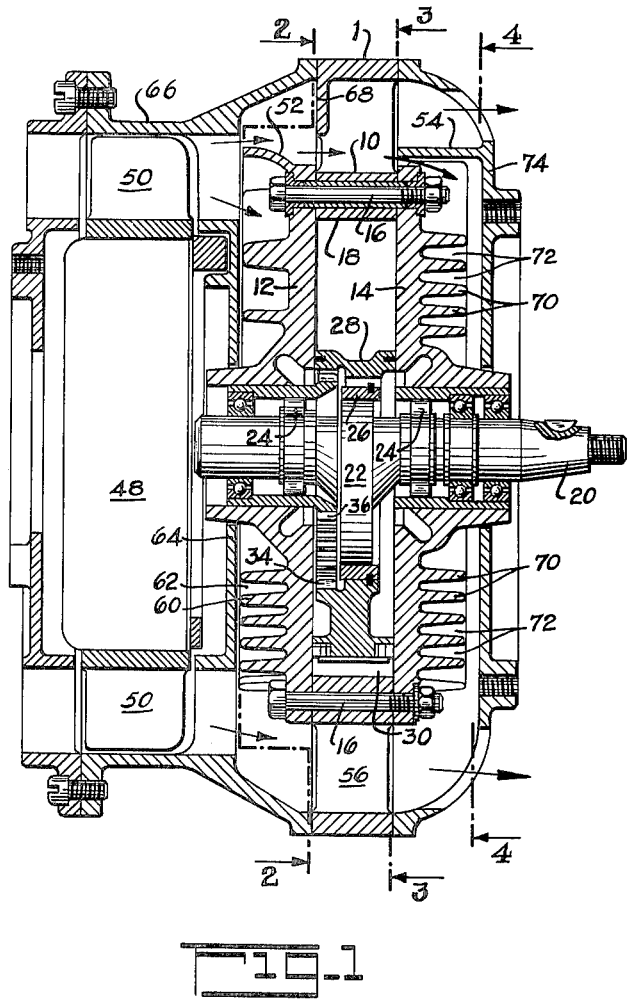

INVENTOR.
WALTER FROEDE
ATTORNEY

INVENTOR.
WALTER FROEDE
BY
ATTORNEY

United States Patent Office 3,234,922
Patented Feb. 15, 1966

3,234,922
AIR COOLING FOR ROTARY ENGINE
Walter Froede, Neckarsulm, Wurttemberg, Germany, assignor to NSU Motorenwerke Aktiengesellschaft, Neckarsulm, Germany, and Wankel G.m.b.H., Lindau (Bodensee), Germany
Filed June 11, 1962, Ser. No. 201,494
Claims priority, application Germany, June 13, 1961, N 20,181
3 Claims. (Cl. 123—8)

This invention relates to rotary combustion engines and more particularly to means for providing air-cooling for rotary combustion engines.

In general engines of this type comprise an outer body having axially-spaced end walls interconnected with a peripheral wall forming a cavity therein. A rotor is mounted within said outer body having seal means mounted in grooves in circumferentially-spaced apex portions of said rotor for continuous engagement with the inner surface of the peripheral wall. The outer body and rotor form working chambers which upon relative rotation vary in volume. Intake means are provided for admitting a fuel-air mixture, an ignition means may if necessary be provided for burning said mixture and an exhaust means is provided for expelling the burnt gases so that a four-cycle process of intake, compression, expansion and exhaust may be carried out. An engine of this type is clearly disclosed in United States Patent 2,988,065, issued to Felix Wankel et al. on June 13, 1961 and reference may be made thereto for a more detailed description of the operation of an engine of this type.

In reciprocating combustion engines air-cooling does not normally create any great problem since the dissipation of heat is substantially uniform over the cylinder periphery. The problem is a substantially more difficult one in the case of air-cooling a rotary combustion engine. In this type of engine the working cycles carried out in each working chamber always occur at the same place in the housing resulting in considerably more heating in that part of the housing wherein ignition, combustion and expansion takes place than in that part wherein the intake cycle takes place. Thus, there is no uniform radiation of heat over the periphery of the housing which must be taken into account when providing cooling for such an engine. It is also necessary to take into account the provision of cooling for the end walls and peripheral wall while at the same time giving consideration to the varying dissipation of heat in these areas.

In general the present invention solves the above-mentioned problems in air-cooling a rotary combustion engine by providing a blower which produces axial streams of air parts of which are directed axially through the peripheral wall of the housing and parts directed from the intake port or "cool" region of the housing to the front end wall and the rear end wall and expelled in a peripheral direction through suitable ports adjacent the engine exhaust port. The portion of the housing wherein the intake port is located is subjected to substantially less heat than the other parts of the housing and since the axial flow produced by the blower is substantially uniform over the entire circumference of the housing, there is an excess of cooling air in this region. This excess is advantageously used for cooling the two end walls while the axial flow of air passing through the "hot" regions of the housing is used exclusively for cooling said "hot" regions.

Accordingly, it is one object of the invention to provide a novel and improved cooling system for a rotary combustion engine.

It is further an object of the invention to provide an air cooling system for a rotary combustion engine said cooling system comprising passageways for cooling air in the peripheral wall and the end walls.

It is additionally an object of this invention to provide means for supplying axially directed cooling air axially across the peripheral wall of a rotary combustion engine and for directing portions of said air supply radially inwardly from the peripheral wall of said housing across the end walls.

Figure 2:
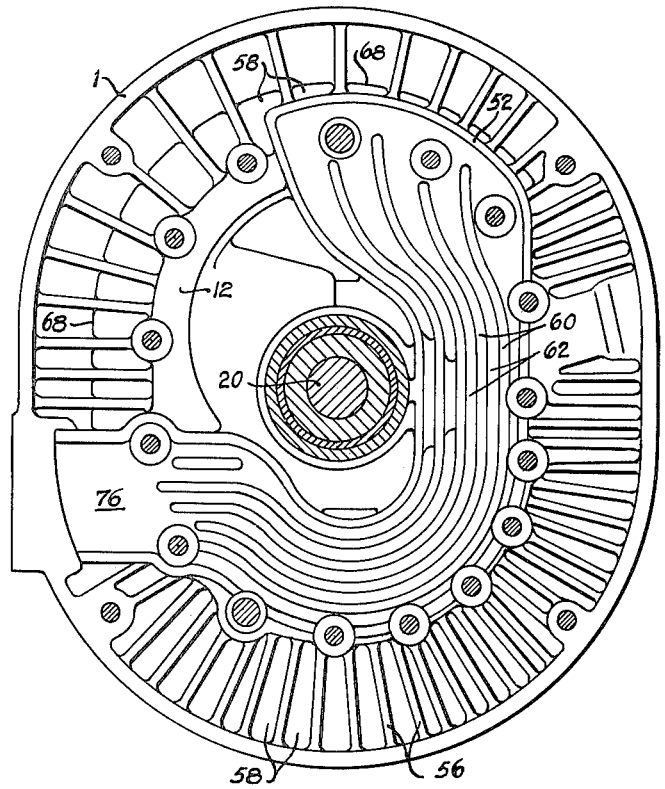
Figure 3:
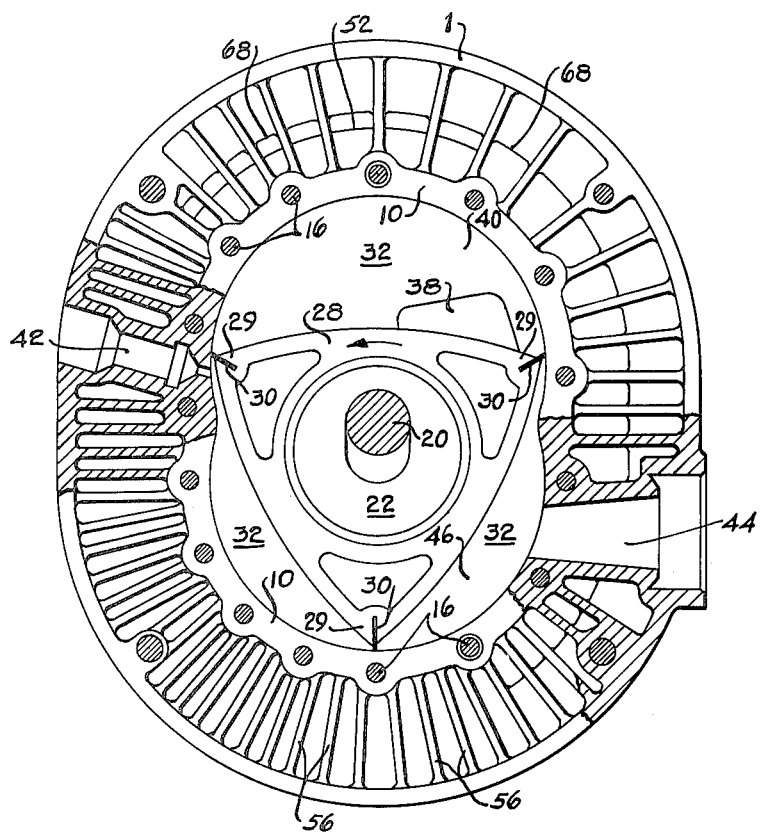
Figure 4:
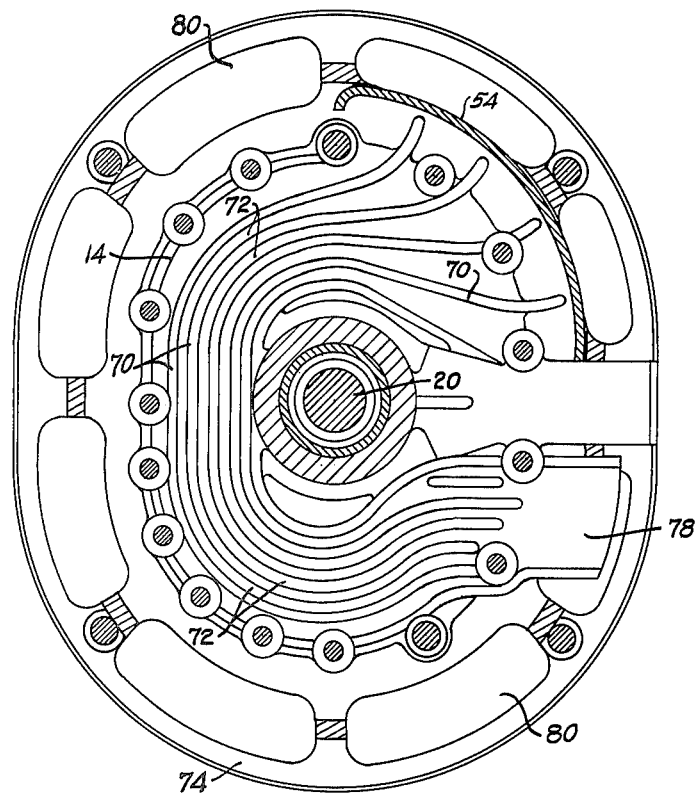

Other objects and advantages of the invention will become apparent when reading the following detailed description with the accompanying drawing in which:

FIGURE 1 is a longitudinal cross-section of a rotary combustion engine embodying the present invention, FIGURE 2 is a sectional view taken along line 2—2 of FIGURE 1, FIGURE 3 is a sectional view taken along line 3—3 of FIGURE 1, and FIGURE 4 is a sectional view taken along line 4—4 of FIGURE 1.

The rotary combustion engine as shown in FIGURE 1 consists essentially of a housing 1 in which there is mounted a peripheral wall 10 interconnected with end walls 12 and 14 by suitable bolts 16. The inner surface 18 of the peripheral wall 10 when viewed in section, as shown in FIGURE 3, has a shape which preferably is basically a two-lobed epitrochoid. A shaft 20 having an eccentric 22 is mounted in the end walls 12 and 14 by means of bearings 24. Rotatably mounted on the eccentric 22 by means of a bearing 26 is a rotor 28 having three circumferentially-spaced apex portions 29 (see FIGURE 3). Radially movable seal strips 30 extending from one end face of the rotor to the other end face are mounted in axially extending grooves in each of the apex portions 29 and slide continuously over the inner surface 18 of the peripheral wall 10 thereby varying the volume in working chambers 32. The speed ratio between the shaft 20 and rotor 28 in the engine illustrated is 3:1 which is positively maintained by means of gearing consisting of an internally-toothed gear member 34 fastened to the rotor and an externally-toothed gear 36 fastened to the end wall 12.

The four-cycle process may be carried out in each of the working chambers 32. In order to bring about four-cycle operation, an intake port 38 opens into lobe 40 for admitting a fuel-air mixture, an ignition spark plug 42 is provided to burn the fuel-air mixture and an exhaust port 44 is provided in lobe 46 for expelling the burnt gases.

Since each of the stages in the process carried out in each operative chamber always occur at the same place with respect to the housing, the housing is subjected to heating which varies substantially around the circumference of said housing. Whereas the areas of the peripheral wall 10 and end walls 12 and 14 that surround the lobe 40 are kept relatively cool by the fresh gas mixture flowing in through intake port 38 and the absence of any burning or conducting of hot gases in this area, the areas surrounding the lobe 46 are subjected to considerable heat absorption because of the burning and expanding gases. This variance in heating has to be taken into consideration when cooling the engine, so that the heat distortion of the housing is kept at a minimum and is kept substantially uniform over the entire circumference of the housing.

The engine satisfies the above consideration through a novel form of air cooling. For this purpose an axial blower 48 having vanes 50 is mounted on shaft 20 which produces an axially directed stream of air axially across the peripheral wall as indicated by the arrows in FIGURE 1. Becuse it can be assumed that the axial currents of air produced by the blower rotor are substantially uniform in magnitude over the entire circumference of the housing, the result is, because of the above-mentioned non-uniform distribution of the heat absorbed by the housing around its periphery, a substantial excess of cooling air is provided in the area of the lobe 40. In other words, since the supply of cool air to the housing is circumferentially uniform and less cooling is needed in the vicinity of the lobe 40 than in the lobe 46, there is an excess of cooling air in lobe 40 in proportion to the need in said lobe as compared to the proportion of cooling air to the need in lobe 46. This excess is taken advantage of and used in cooling the areas of the housing end walls wherein greater heating is produced, namely the areas of combustion expansion and exhaust. Consequently the cooling system is arranged so that the axial stream of air that flows through the housing peripheral wall in the area of lobe 46 passes through said peripheral wall without hindrance or throttling. However, the axial stream of air flowing in the area of lobe 40, or in the area of intake port 38, is divided into two partial streams, one of which is diverted by guide plate 52 to cool the front end wall 12 and the other of which is diverted by guide plate 54 to cool rear end wall 14, as will be explained in greater detail below.

As shown in FIGURES 2 and 3, the peripheral wall 10 is provided with substantially radial ribs or fins 56 which define between them air-cooling passages 58. The spacing of the fins 56 varies according to the amount of heat dissipated in a particular area so that, in the region of spark plug 42 and in the adjacent region of lobe 46, the spacing is the smallest while in the region of lobe 40, the spacing is the greatest. Due to this construction, a greater heat-radiating surface per unit area is obtained in the region where the greatest heat absorption of the housing occurs.

As stated above, the axial stream of air approaching the region of lobe 40, as viewed in FIGURES 1 and 3, is in part conducted by guide plate 52 to the housing front end wall 12. As viewed in FIGURE 2, the housing end wall 12 is provided with external ribs or fins 60 which project therefrom substantially parallel to the housing axis. The rib members 60 extend from the region of intake port 38 in lobe 40 along the peripheral wall in the combustion zone in lobe 46 and terminate in an area adjacent the exhaust port 44. The rib members 60 are spaced so as to define between them air-cooling passages 62 which are covered on their outside by wall 64 of the blower housing 66. As can be seen in FIGURE 1, the upper part of end wall 12 is in the form of a plate or scoop 52 by which air may be diverted from the axial stream to the cooling passages 62. Only a part of the axial stream cooling air is caught by the plate 52 and another part of said stream of air not caught by said plate is compelled by a skirt 68 on the peripheral wall 10 to flow through cooling passages 58 as near as possible to the inner surface of said wall 10 which is exposed to heat. As shown in FIGURE 1, the stream of cooling air which approaches near but is not diverted by the plate 52, as viewed in the peripheral direction, flows through passages 58 in the region of lobe 40 and a portion of this air is then guided by a plate 54 positioned adjacent the rear end wall 14. The rear end wall 14 is, as in the case of end wall 12, provided with axially projecting ribs or fins 70 forming passages 72 which are closed in by the covering cowl 74. The passages 72 extend in the same manner as the passages 62 and also terminate in an area adjacent the exhaust port 44 but on an opposite side from said passages 62.

As can be seen in FIGURES 1-3, the ribs 56 are so spaced that an unhindered or unrestricted axial flow of air through the housing is made possible in the region of lobe 46. In order to ensure that this axial flow of air is not diverted or disturbed by the partial streams flowing over the end walls, the passages 62 and 72 terminate in ports 76 and 78 which carry off the partial streams laterally from the end wall periphery on both sides of the exhaust port 44. Therefore, it can be seen that, since a portion has already been provided in the housing for exhaust port 44 (see FIGURE 3) through which axially directed air could not flow in any event, positioning the ports 76 and 78 at each side of the exhaust port 44 does not further hinder or obstruct the flow of axial air through the housing and the heated air discharged from ports 76 and 78 will flow from said housing in the same direction as the exhaust gases from exhaust port 44. The axial streams passing through the peripheral wall 10 which have been heated up are discharged in an axial direction through slits or ports 80 in the covering cowl 74.

Thus it can be seen that, by the construction of the present invention, satisfactory air-cooling is provided in a rotary combustion engine while giving special consideration to the non-uniform heating characteristics of this type engine. The invention has the advantage that a single cool air source may be used even though the cooling air is eventually directed in paths different from that leaving the source. This may be accomplished because of the fact that the invention takes advantage of the varying need in cooling air throughout the engine housing by providing means for diverting some of the cooling air, within the housing from regions wherein less heat is produced to regions wherein more cooling is needed because of greater heating. Therefore, reliable cooling is provided even in the regions in which a relatively large amount of heat is produced.

While the invention has been set forth in detail in the above description, it is not intended that the invention be limited to the specific embodiments set forth therein and that various modifications and changes may be carried out without departing from the spirit and scope of the invention.

What is claimed is:

1. An air cooling construction for a rotary internal combustion engine having an outer body including a pair of end walls and a peripheral wall interconnected with said end walls to form a cavity; intake means in a first region of said outer body for supplying air to the rotary internal combustion engine for supporting combustion therein; a combustion zone located adjacent a second region of said outer body wherein combustion is initiated; exhaust means in a third region of said outer body for discharging the burnt gases from the rotary combustion engine whereby the heat input to said second and third regions of said outer body is substantially higher than the heat input to said first region of said outer body; a first plurality of radially-projecting, substantially circumferentially-spaced cooling fins disposed over the outer surface of said peripheral wall and extending axially from one end of said peripheral wall to the other end thereof; a second plurality of axially-projecting substantially radially-spaced cooling fins disposed on and extending circumferentially around a portion of the axially outer face of each of said end walls; an outer housing substantially surrounding said outer body and covering said first plurality of fins to define a plurality of closed axially-extending cooling air passages around said outer body, said outer housing cooperating with said second plurality of fins to define a plurality of cooling air passages extending from a location adjacent to said first region through said second region to a location adjacent to said third region of said outer body, and said outer housing having a first opening at one axial end, and a second opening at the opposite axial end of said housing for directing an axial flow of cooling air between said first and second openings; guide means positioned in said first region and proximate said first housing opening to direct a first portion of said air flow into the cooling air passages on the end wall adjacent said first opening, the remainder of said air flow passing through said axially-extending cooling air passages across the outer surface of said outer body, and further guide means positioned in the first region and proximate the second housing opening to direct a portion of the remainder of said cooling air flow into the cooling air passages on the end wall adjacent said second opening, the balance of the remainder of said cooling air flow exhausting through said second housing opening.

2. An air cooling construction as recited in claim 1 wherein said cooling air passages on each of said end walls have discharge openings disposed for discharging cooling air therefrom adjacent each side of said exhaust means so that the exhaust gases discharged from said engine are cooled by the cooling air discharged from said cooling air passages on each of said end walls.

3. In a rotary combustion engine, an outer body having a pair of end walls and a peripheral wall, said end walls and said peripheral wall being interconnected with the radially inner surface of said peripheral wall and the axially confronting faces of said end walls forming a cavity; intake means in said outer body communicating with said cavity; a combustion zone adjacent one region of said outer body wherein combustion is initiated and exhaust means for discharging the gases produced in said combustion zone from said outer body, said combustion zone and said exhaust means being located so as to define a sector around a portion of said outer body from said combustion zone to said exhaust means which has a relatively high heat input and said intake means being located so as to define a sector from said intake means to said combustion zone in one direction and from said intake means to said exhaust means in the opposite direction which has a relatively low heat input; a plurality of radially-projecting, axially-extending and substantially circumferentially-spaced cooling fins disposed on the outer surface of said peripheral wall; a housing substantially surrounding said outer body, said housing being spaced from said outer body and in close proximity to said cooling fins to define a plurality of axially-extending cooling air passages around the outer surface of said outer body, said housing having an inlet opening at one axial end thereof for receiving a stream of cooling air and an exhaust opening at its other axial end for discharging a stream of cooling air from said passages, said openings being connected by said axially-extending cooling passages for directing the cooling air axially across the outer surface of said outer body; first guide means disposed adjacent to said housing inlet opening and the upstream end of said axially-extending cooling passages in the relatively low heat input sector of said outer body for directing a portion of the cooling air received from said inlet opening at said one axial end of said housing from the relatively low heat input sector of said outer body; a plurality of cooling air passages disposed on one of said end walls for receiving said portion of cooling air from said first guide means for guiding said portion of cooling air for passage over the outer surface of the relatively high heat input sector of said one of said end walls; second guide means disposed adjacent to said housing exhaust opening and the downstream end of said axially-extending cooling passages in the relatively low heat input sector of said outer body for directing a portion of the remainder of the cooling air adjacent the downstream end of said axially-extending cooling passages from the relatively low heat input sector of said outer body; a plurality of cooling air passages disposed on the other of said end walls for receiving said portion of the remainder of said cooling air from said guide means for guiding said portion of the remainder of the cooling air over the outer periphery of the relatively high heat input sector of said other of said end walls; and the balance of the remainder of the cooling air adjacent the downstream end of said axially-extending cooling passages in the relatively low heat input sector being discharged therefrom through said exhaust opening at the downstream axial end of said housing.

References Cited by the Examiner

UNITED STATES PATENTS

| 1,024,166 | 4/1912 | Weed. | |
| 1,564,286 | 12/1925 | Smith. | |
| 1,712,945 | 5/1929 | Thannhauser | 123—8 |
| 2,079,192 | 5/1937 | Upshaw | 123—8 |
| 2,112,844 | 4/1938 | Howard | 123—8 |
| 2,856,753 | 10/1958 | Herzog | 123—8 |
| 2,939,438 | 6/1960 | Bush | 123—8 |
| 2,988,065 | 6/1961 | Wankel et al. | 123—8 |

SAMUEL LEVINE, *Primary Examiner.*

JOSEPH H. BRANSON, Jr., KARL J. ALBRECHT,
*Examiners.*